UNITED STATES PATENT OFFICE.

JOHN B. HALL, OF PHILADELPHIA, PENNSYLVANIA.

FIBER COMPOSITION AND PROCESS OF MAKING THE SAME.

1,000,598.      Specification of Letters Patent.    Patented Aug. 15, 1911.

No Drawing.     Application filed December 2, 1910.   Serial No. 595,247.

*To all whom it may concern:*

Be it known that I, JOHN B. HALL, a citizen of the United States, residing in the city and county of Philadelphia, State of Pennsylvania, have invented a new and useful Fiber Composition and Process of Making the Same, of which the following is a specification.

My invention consists of a composition of matter and a process for making the same, which composition possesses insulating and incombustible properties, which is waterproof, and which is capable of being molded or otherwise formed into any suitable or desired shape.

It further consists of such a composition which may be employed in the place of rubber, wood, cork or asbestos.

In preparing my composition I take clay and water in suitable proportions to make a smooth and milky solution (mechanical, not chemical) by stirring and beating, and thereupon by suitable agitation of this solution with oil, resin or other oleaginous or resinous hydro-carbon an emulsion is made, to which a finely comminuted fibrous substance, such as paper, vegetable stems or leaves, peat, bark or any other fibrous substance is added. Glue or similar viscous substance is added to the emulsion in proportion as desired or required. The mass thus produced is dried with or without the application of heat, and may, when of suitable consistency, be molded or pressed into suitable or desired form and worked into proper finish.

By increasing or decreasing the proportions of the oleaginous or resinous hydro-carbon, the electric insulating properties of the composition are increased or decreased, and by increase or decrease of the proportions of oleaginous and viscous substances, the yielding and elastic properties of the composition are increased or decreased. By employing the fibrous substance in a finely comminuted state, the texture or consistency of the composition will be smooth and even, and more or less body will be given the finished composition by the employment of fibrous substance and clay in greater or less proportions.

The composition is a non-conductor of electricity and heat and may be prepared to have great plasticity so as to allow of its being shaped into various forms.

The composition may be employed in the place of rubber, wood, cork, asbestos and a number of other natural or artificial substances.

I am aware that compositions have been made composed of clay and water mixed to a milky consistency and thereupon mixed with tar to form an emulsion to which is added finely ground cork, and I am also aware that an asphalt paving composition has been made in which resinous, viscous, oleaginous substances and volatile hydro-carbon have been added to the asphalt before mixing the latter with the sand and gravel, and I do not wish to make any claim to such compositions nor the method of preparing the same, but I am not aware of any composition prepared in the manner nor from the ingredients set forth.

Having thus described my invention, what I claim as new and desire to secure by Letters Patent, is:—

1. A composition consisting of a finely comminuted fibrous substance mixed with an emulsion of clay dissolved in water, an oleaginous or resinous substance and a viscous substance, and subsequently dried.

2. The process of producing a fibrous composition which consists in dissolving clay in water by agitation to form a milky solution, emulsifying oleaginous or resinous substances with such solution, adding a viscous substance to the emulsion, mixing finely comminuted fibrous material into such emulsion, and finally expelling the water from such composition.

JOHN B. HALL.

Witnesses:
    E. HAYWARD FAIRBANKS,
    C. D. McVAY.